(12) United States Patent
Potocki

(10) Patent No.: US 6,344,266 B1
(45) Date of Patent: Feb. 5, 2002

(54) PROTECTIVE PARKING PAD

(75) Inventor: John Charles Potocki, Hanover, PA (US)

(73) Assignee: St. Barsabas Inc., Abbottstown, PA (US)

( * ) Notice: Subject to any disclaimer, the term of this patent is extended or adjusted under 35 U.S.C. 154(b) by 0 days.

(21) Appl. No.: 09/526,501

(22) Filed: Mar. 16, 2000

Related U.S. Application Data

(63) Continuation-in-part of application No. 09/149,302, filed on Sep. 9, 1998, now abandoned.

(51) Int. Cl.[7] ............................................. B32B 3/26
(52) U.S. Cl. .................... 428/304.4; 428/158; 428/160; 296/38
(58) Field of Search ............................. 428/304.4, 158, 428/160; 296/38

(56) References Cited

U.S. PATENT DOCUMENTS

| | | | | |
|---|---|---|---|---|
| 3,243,492 A | * | 3/1966 | Voelker | 264/346 |
| 3,483,069 A | * | 12/1969 | Cairns et al. | 161/59 |
| 3,658,972 A | * | 4/1972 | Ready et al. | 428/304.4 X |
| 3,696,771 A | * | 10/1972 | Ambrose | 112/417 |
| 3,858,636 A | * | 1/1975 | Kibler | 152/330 |
| 4,302,272 A | * | 11/1981 | Phillips et al. | 428/304.4 X |
| 4,318,761 A | * | 3/1982 | Dockray et al. | 428/304.4 X |
| 5,556,692 A | * | 9/1996 | Zheng | 428/156 |

* cited by examiner

*Primary Examiner*—Daniel Zirker
(74) *Attorney, Agent, or Firm*—John E. Simms, Jr.

(57) ABSTRACT

A protective parking pad constructed of compressible and resilient material with temperature insulating properties and constructed to the appropriate size and dimensions to allow a set of protective parking pads, as disclosed, to be positioned on the floor of a parking area so that each tire of a parked vehicle rests on one protective parking pad. The object of the invention is to support the vehicle tires in a manner which maintains a round shape and to insulate the vehicle tire from rapid heat transfer to the floor of the parking area; thereby, protecting the vehicle tire from receiving a temporary or permanent deformation or "flatspot".

2 Claims, 1 Drawing Sheet

PROTECTIVE PARKING PAD

This is a Continuation-in-Part application under prior application Ser. No. 09/149,302, now abandoned, entitled Protective Parking Pad.

BACKGROUND OF THE INVENTION

The present invention is a protective parking pad with temperature insulating properties and constructed of compressible and resilient material which will compress under the weight of a vehicle parked on it and having an amount of resistance to compression so as to support the vehicle tire in a manner that minimizes the amount of distortion of tire shape.

Rubber vehicle tires suffer from a problem known as "flatspotting" which is a permanent distortion in the shape of a tire. A vehicle tire is manufactured to have an equal measurement of radius from the center of the axle to a point on the outer edge of the tread at any point around the circumference of the tread. A tire manufactured in this manner will have a round shape which will allow the axle to maintain a constant distance above the road and provide a smooth ride for the vehicle. When a vehicle is parked, the weight of the vehicle deforms the lowermost portion of the tire where the weight of the vehicle is being supported. The rubber in the tread and sidewall in this lowermost area is compressed and deformed by the weight of the vehicle. The casing and belts of a tire are bonded to the tread and sidewalls. The compressed and deformed areas of the tread and sidewalls exert pressure on the casing and belts, forcing the casing and belts to deform as well. When the vehicle is driven, the tire becomes heated by friction and expands. The constant flexing of the rubber, caused as each portion of the tire receives the weight of the vehicle as the tire rotates, allows the tire to return to its original round shape, aided by the resiliency of the belts and casing.

The problem, known as "flatspotting", occurs when the deformation of the tire, which is caused when the vehicle is parked, becomes permanent. The permanent deformation results in a smaller radius of the vehicle tire at the point where the deformation exists. The permanently deformed tire is no longer round and the result is a bumpy ride and substantially reduced handling performance.

The permanent deformation occurs when a vehicle remains parked in one position for an extended period of time. The areas of the rubber tread and sidewalls which are supporting the vehicle will deform under the weight. The rubber tread and sidewalls are bonded to the belts and casing of the tire and the deformed areas of the tread and sidewalls exert constant pressure on the belts and casing, to which they are bonded, to deform the belts and casing to the same shape as the tread and sidewall. If the vehicle is driven after a short period of time, for example a time not exceeding several days, the resiliency of the belts and casing will force the tire to return to its original round shape as it is warmed and flexed during use. If the vehicle is not driven for a long period of time, for example one month, the belts and casing gradually lose their resiliency and become permanently deformed under the constant pressure from the tread and sidewalls. When the vehicle is driven, the belts and casing do not force the tire to return to its original round shape. The tire is permanently damaged.

The effect of tire deformation is exacerbated by other factors. One factor is the range and rate of temperature change. Once vehicle tires have been warmed by use, parking on the cool floor of a garage rather than a warm outdoor parking area, will increase the amount of compression of the rubber tread and sidewalls. The loss of heat in the area of the tire which is in contact with the cool floor, is the same area of the tire which has been deformed by the weight of the vehicle. The extent to which the rubber is compressed is increased by the drop in temperature. Another factor is the softness of the tire itself. A softer tire will compress more and therefore deform more than a hard tire. A third factor is the height of the sidewall relative to the width of the tread. The new style of performance tires feature short sidewalls to increase sidewall stiffness. In this type of tire, the stiff sidewall retains its shape to a greater extent in the area where the vehicle weight is being supported and the pressure from the weight of the vehicle is concentrated on the tread portion causing the deformation of the tread portion to be more pronounced; thereby increasing the extent of deformation of the belts and casing. The factors, including the rate and range of temperature change and tire construction work to decrease the amount of time required to cause permanent, as opposed to temporary, deformation of tire belts and casing, and a permanent "flatspot".

The problem of "flatspotting" occurs most often with vehicles which are used on an occasional basis. The worst problems occur with high performance cars used by enthusiasts. The high performance tires operate at high temperatures and high performance tires are softer, with short sidewalls, to enhance performance. Often, the cars are kept in a garage and used occasionally. All of the factors which contribute to flatspotting are present. Typically, flatspotting is prevented by lifting the vehicle onto a set of stands, so that it is supported on its frame and not on its tires. This method is time consuming and impractical. Also, while the vehicle is on the stands, the springs and shock absorbers are fully extended which causes undue wear to these components.

A need exists for a device to prevent tire flatspotting, without the necessity of lifting the vehicle. In addition to the need of car enthusiasts, other situations where vehicles remain parked for extended periods of time will benefit from the present invention. Equipment on trailers, construction equipment, farm equipment, military vehicles and aircraft could all benefit from the present invention as well as any vehicle in a long term parking situation.

SUMMARY OF THE INVENTION

The present invention comprises a temperature insulating pad of compressible and resilient material, such as microcellular water blown polyether based polyurethane foam constructed to a density so as to provide resiliency characteristics matching the weight carried by a vehicle tire, and constructed with a top side, a bottom side, a front edge a back edge and two side edges. The top and bottom sides being parallel to each other and the back and side edges being perpendicular to the top side and bottom side. The front edge being beveled to form a sloping surface from the top side toward the bottom side and the portion of the top side at the back edge having a raised area along the back edge. The pad being constructed with a thickness from the top side to the bottom side appropriate to allow partial but not complete compression, when a vehicle is parked with a tire resting on the protective parking pad.

The present invention addresses the problem of tire "flatspotting" by providing a plurality of protective parking pads which may be positioned on the floor of the vehicle parking area so that each vehicle tire rests on a protective parking pad when the vehicle is parked in its usual position.

When the vehicle is parked on the protective parking pads, the pads partially compress and conform to the round shape of the tires, thus distributing the vehicle weight over a large area of the tread and sidewall surface in a shape duplicating the normal curvature of the tire; thereby reducing the extent to which the tire is deformed. The pads insulate the tires from rapid transfer of heat from the tires which occurs when the tires directly contact the parking area floor. The rapid transfer of heat from the tires, increases the contraction of the rubber tread and sidewalls. The increased contraction increases the pressure on the belts and casings of the tires; thereby adding to the degree of deformation which has occurred in the area of the belts and casings upon which the vehicle weight is resting. The undesirable effects of rapid heat transfer from the tires and of deformation of the tires, are avoided by the present invention. The tires will remain in their normal round shape and "flatspotting" will not occur regardless of the length of time during which the vehicle remains parked on the protective parking pads.

DESCRIPTION OF THE PREFERRED EMBODIMENT

Figure 1:
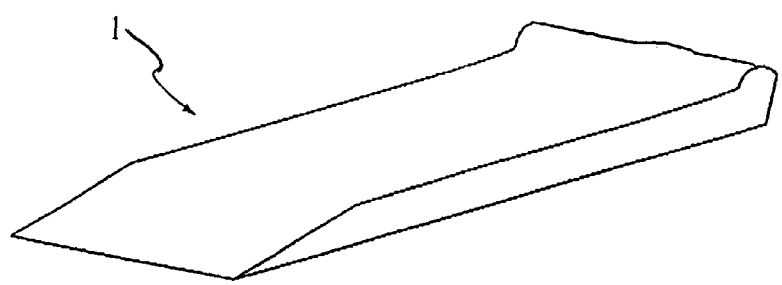
FIG. 1 is a perspective view of the protective parking pad.
Figure 2:
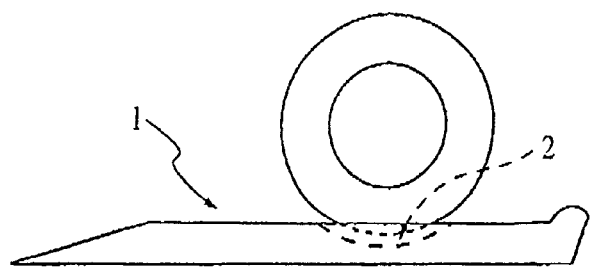
FIG. 2 is a side elevation view of a protective parking pad showing a vehicle tire resting in the depression, which the tire has formed.
Figure 3:
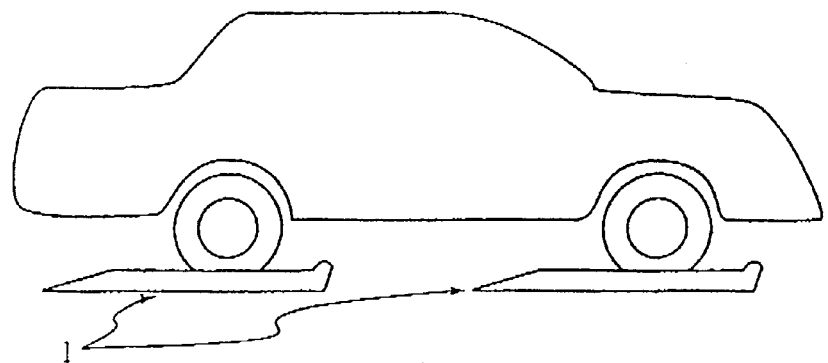
FIG. 3 is a side elevation view showing two protective parking pads positioned to receive the front and rear tires of a parked vehicle.
Figure 4:
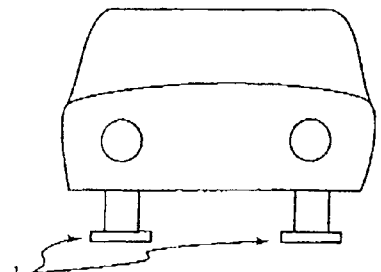
FIG. 4 is a rear elevation view of two protective parking pads positioned to receive the two front tires of a parked vehicle.

A protective parking pad 1 as shown in FIGS. 1 and 2 constructed of compressible and resilient material with temperature insulating properties, such as microcellular water blown polyether based polyurethane foam and constructed to a size, thickness and density appropriate to the vehicle for which it is intended. The protective parking pad disclosed herein is designed for use with a passenger car, having a vehicle weight of approximately 1,310 to 2275 kilograms (2,900 to 5,000 pounds) and is intended to be used as a set of four protective parking pads positioned so that each vehicle tire rests on one protective parking pad when the vehicle is parked in its usual position, as shown in FIG. 3 and FIG. 4. The protective parking pad is formed with a bottom side having a rectangular shape and dimensions of approximately 36 centimeters by 46 centimeters (14 inches by 18 inches), the dimensions being selected to produce a pad slightly larger than the area of the tire which contacts the parking surface (the protective parking pad generally having dimensions of length and width of approximately 46 to 92 centimeters and 36 to 72 centimeters (18 to 36 inches and 14 to 28 inches) respectively), a top side parallel to the bottom side, a front edge, a back edge and two side edges, the back and side edges being perpendicular to the top and bottom sides, and the front edge being beveled to form a sloping surface from the top side toward the bottom side, and the portion of the top side at the back edge having a raised area along the back edge. The thickness, measured between the top and bottom sides is approximately 3.81 centimeters (1.5 inches), and the polyurethane foam is molded to a density of approximately 0.35 to 0.46 grams per cubic centimeter (25 to 29 pounds per cubic foot). The product, Bayer, Bayflex® 904, prepared at 0.42 grams per cubic centimeter (26 pounds per cubic foot) density yielded a material with a tensile strength of approximately 11.77 kilograms per square centimeter (167 pounds per square inch). The product may be prepared at varying densities. The product prepared to a density of 0.35 to 0.46 grams per cubic centimeter (25 to 29 pounds per cubic foot) resulted in a product having tensile strength of 10.9 to 13.4 kilograms per square centimeter (155 to 190 pounds per square inch). The tensile strength will vary in proportion to the density.

The present invention is suitable for all types of vehicle. The dimensions of the bottom side and the top side can be varied to accommodate larger or smaller vehicle tires and the density of the polyurethane foam and the thickness of the pad can be increased or decreased to accommodate vehicles of varying weight. It should be noted that an increase in density of the polyurethane foam or other suitable material is the most economical method for manufacturing a protective parking pad designed for a heavier vehicle, because the same mold may be used to produce a pad which will support the heavier vehicle without fully compressing. Limitations of current molding techniques effectively limit the maximum density to which suitable material can be molded, and beyond that limit, an increased weight bearing capacity must be attained by increasing the thickness of the pad.

The invention as disclosed herein, when used in a set of four and positioned so that each pad receives the weight of one tire, while the vehicle is parked, will support the vehicle tires in a depression in the top of the pad, which forms when the tire rests on the pad. The pad will partially but not completely compress, so that the depression in the pad conforms to the round shape of the tire, the resiliency of the pad supports the weight of the tire over the whole area of the depression formed by the weight of the tire and maintains the round shape of the tire without deformation of the tire, for as long as the vehicle remains parked. The pad insulates the tire from rapid heat transfer to the floor of the parking area which is likely to be substantially cooler than the tire at the time the vehicle is parked. The invention as disclosed herein eliminates or substantially reduces the deformation of tire shape and rapid reduction in temperature of the lowermost rubber parts of the tire tread and sidewalls, which bear the weight of the vehicle. The temperature insulating properties of the protective parking pad operate to slow the rate of heat transfer from the lowermost areas of the rubber tread and sidewalls of the tire; thereby greatly reducing the extent to which the rubber becomes compressed, which in turn reduces the pressure on the belts and casing of the tire. The belts and casing of the tire are not deformed from their normal shape and are not subjected to the force of compression exacerbated by a rapid transfer of heat; therefore, the said belts and casing are not deformed in a manner which, over time, will overcome the resiliency of the belts and casing. By eliminating or substantially reducing the pressure on the belts and casing of the tire, permanent damage to the tire is avoided, even when the vehicle remains parked for a long period.

The beveled front edge and the raised area along the rear edge assist the driver of the vehicle in parking with the tires in the proper position on the pads.

In addition to microcellular water blown polyether based polyurethane foam, the protective parking pad may be formed of foamed elastomer material consisting of polyurethane foam, natural rubber or synthetic rubber.

The applicant claims:

1. A protective parking pad, for parking a vehicle, having rubber tires, comprising;

an elongated pad formed of foamed elastomer selected from the group of materials consisting of polyurethane, natural rubber or synthetic rubber said material being compressible and resilient;

having temperature insulating properties;

having a density of approximately 0.35 to 0.46 grams per cubic centimeter (25 to 29 pounds per cubic foot), tensile strength of 10.9 to 13.4 kilograms per square centimeter (155 to 190 pounds per square inch) and a thickness of approximately 3.8 centimeters (1.5 inches);

having a top side and a bottom side being parallel and being constructed to dimensions of length and width approximately 46 to 92 centimeters and 36 to 72 centimeters (18 to 36 inches and 14 to 28 inches) respectively, for protecting said tires from flatspotting by compressing to form a depression in the pad which conforms to the shape of the tire, resiliently supporting the tire over the whole area of contact between tire and pad and thermally insulating the tire from the parking surface.

2. The invention as claimed in claim 1, said foamed elastomer material being microcellular water blown polyether based polyurethane foam.

* * * * *